United States Patent
Kelley et al.

(10) Patent No.: US 7,382,311 B2
(45) Date of Patent: Jun. 3, 2008

(54) METHOD, COMPUTER PROGRAM PRODUCT AND SYSTEM FOR DIFFERENTIATING PHYSICAL SOURCES FROM SECOND ORDER NONLINEAR SIGNAL EFFECTS

(75) Inventors: Jonathan Clay Kelley, Baltimore, MD (US); Francis William Hopwood, Severna Park, MD (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 79 days.

(21) Appl. No.: 11/556,792

(22) Filed: Nov. 6, 2006

(65) Prior Publication Data

US 2008/0106466 A1    May 8, 2008

(51) Int. Cl.
*G01S 13/00* (2006.01)
(52) U.S. Cl. .................. 342/81; 342/157; 342/158; 342/193; 342/371; 342/375
(58) Field of Classification Search .............. 342/13, 342/27, 28, 81, 90, 102, 157, 158, 193–195, 342/368–375
See application file for complete search history.

(56) References Cited

U.S. PATENT DOCUMENTS

| | | | | | |
|---|---|---|---|---|---|
| 4,749,995 | A | * | 6/1988 | Hopwood et al. | 342/371 |
| 5,079,557 | A | * | 1/1992 | Hopwood et al. | 342/373 |
| 6,414,627 | B1 | * | 7/2002 | McEwan | 342/134 |
| 2007/0274152 | A1 | * | 11/2007 | Rees | 367/7 |

FOREIGN PATENT DOCUMENTS

| JP | 2006250751 A | * | 9/2006 |
|---|---|---|---|
| SU | 462145 A | * | 9/1975 |

* cited by examiner

*Primary Examiner*—John B Sotomayor
(74) *Attorney, Agent, or Firm*—Alston & Bird LLP

(57) ABSTRACT

A system for differentiating between a signal from a physical source and a nonlinear signal effect includes an array, a delay control element and a signal processing element. The array is configured to detect a signal at a particular location using an initial time delay. The delay control element is configured to modify the initial time delay by a selected value and to apply a phase delay in an amount equal to the selected value and at a frequency of the signal. The signal processing element is configured to determine whether the signal corresponds to one of a physical source or a nonlinear signal effect based on whether a shift in a perceived location of the signal occurs.

22 Claims, 7 Drawing Sheets

METHOD, COMPUTER PROGRAM PRODUCT AND SYSTEM FOR DIFFERENTIATING PHYSICAL SOURCES FROM SECOND ORDER NONLINEAR SIGNAL EFFECTS

FIELD OF THE INVENTION

Embodiments of the present invention relate generally to electronically scanned antennas, and more particularly, to differentiating between physical sources and nonlinear signal effects in electronically scanned antennas.

BACKGROUND OF THE INVENTION

Radar has long been employed in applications such as air traffic control, fire control, navigation, etc. Due to the many advantages of radar usage in such applications, radar has also been the subject of continuous improvement efforts. One of the fundamental requirements of many types of radar is the implementation of some form of beam steering in order to conduct a sweep of a particular area in an effort to, for example, detect contacts, targets, navigation aids, etc. Conventional radars typically employed mechanical beam steering methods. For example, a commonly recognized image of a radar antenna is a parabolic antenna mounted on a rotating apparatus which steers the antenna. Such rotating radars often utilize complex mechanical mechanisms such as hydraulics, electric motors or hinge appendages in order to achieve the rotation that provides beam steering. However, mechanical apparatuses such as those listed above often require intensive maintenance in order to ensure optimal performance. Additionally, failure of a single element of rotating radars may render the entire apparatus unusable. Rotating radars also suffered limitations in scanning rates due to the mechanical rotation, which translated into limitations with respect to contact or target detection.

In order to overcome several of the disadvantages of conventional radars, electronic scanning antennas (ESAs) have been developed, which are also known as phased array radars. ESAs are a revolutionary type of radar whose transmitter and/or receiver functions are composed of numerous small modules which may either receive or both transmit and receive. ESA radars perform electronic beam steering which can be done without the limitations caused by physical rotation. Accordingly, ESAs feature short to instantaneous (millisecond) scanning rates. Additionally, since ESAs do not rotate, ESA radars have vastly simpler mechanical designs and require no complex hydraulics for antenna movement or hinge appendages that may be prone to failure. The ESA radar also occupies less space than a typical radar because ESAs have reduced infrastructure requirements as compared to rotating radars. The distributed nature of the transmit function in an ESA also eliminates the most common single-point failure mode seen in conventional rotating radars of lost ability to rotate. Given the improvements above, ESA maintenance crews are far less severely taxed, and the ESA radar is much more reliable than a comparable rotating radar. In addition to having much higher scanning rates than conventional radar, ESAs also typically have a much longer target detection range, higher capabilities in terms of the number of targets that can be tracked and engaged (multiple agile beams), low probability of intercept, ability to function as a radio/jammer, simultaneous air and ground modes, etc.

Although ESA radars represent a significant improvement over conventional radars, there is still a desire to improve the capabilities of ESA radars. In this regard, wideband receive-only microwave phased array antennas, for example, have been introduced into many new applications on naval, airborne and space platforms. However, due to microwave device nonlinearity, ESAs have shown inherent problems with creating spurious signals. For example, spurious signals known as "ghost beams" (i.e., signals that are internally generated and appear to originate at angles and frequencies other than their true origin) are particularly prone to creation in signal rich environments (i.e., environments with relatively large numbers of targets) due to a combination of the signal environment with nonlinear device properties. The ghost beams may result in false alarms, confusion, or other problems since the ghost beams indicate the presence of targets at locations and frequencies where no targets actually exist.

ESAs typically use time delay circuitry in order to demonstrate wider bandwidth and improve directionality of the antennas. Nonlinearities that follow the time delay circuitry cause harmonic responses and intermodulation of detected signals. Accordingly, a resulting superset of perceived signals includes not only signals corresponding to actual signal sources, but also includes harmonics of each signal corresponding to the actual signal sources and additional signals corresponding to the combined effects of each pair of signals corresponding to the actual signal sources (i.e., sum and difference of distinct frequencies). The resultant ghost beams are indiscernible from responses corresponding to actual signal sources and thereby generate clutter that may obscure true sources, scramble signals from the true sources, or masquerade as true sources themselves. In order to deal with ghost beams, conventional systems have attempted to improve microwave device linearity, which requires problematic amounts of direct current (DC) power inserted into the post-time delay circuitry. Additionally, conventional systems have employed very complex channelizing filters.

Accordingly, in light of the discussion above, it may be desirable to provide a method of overcoming the problems related to ghost beam generation in a way which would not require large amounts of DC complex channelizing filters.

BRIEF SUMMARY OF THE INVENTION

Accordingly, in order to improve the response of ESAs to the phenomena of ghost beams, while avoiding the problems discussed above, a system and method for differentiating between physical sources and second order nonlinear signal effects in electronically scanned antennas is provided. Embodiments of the present invention employ a phase delay in combination with a time delay in order to ascertain the nature of detected signals. In this regard, when a signal of interest is detected, the signal of interest is interrogated by adding a phase delay in place of an equivalent amount of time delay offset from the time delay used to detect the signal of interest. The frequency used for the phase delay is the same as the frequency of the detected signal of interest.

In one exemplary embodiment, a method for differentiating between physical sources and second order nonlinear signal effects in electronically scanned antennas is provided. The method includes detecting a signal at a particular location using an initial time delay, modifying the initial time delay by a selected value, applying a phase delay in an amount equal to the selected value and at a frequency of the signal, and determining whether the signal corresponds to one of a physical source or a nonlinear signal effect based on whether a shift in a perceived location of the signal occurs.

In another exemplary embodiment, a computer program product for differentiating between physical sources and second order nonlinear signal effects is provided. The computer program product includes at least one computer-readable storage medium having computer-readable program code portions stored therein. The computer-readable program code portions include first, second, third and fourth executable portions. The first executable portion is for detecting a signal at a particular location using an initial time delay. The second executable portion is for modifying the initial time delay by a selected value. The third executable portion is for applying a phase delay in an amount equal to the selected value and at a frequency of the signal. The fourth executable portion is for determining whether the signal corresponds to one of a physical source or a nonlinear signal effect based on whether a shift in a perceived location of the signal occurs.

In another exemplary embodiment, a system for differentiating between physical sources and second order nonlinear signal effects in electronically scanned antennas is provided. The system includes an array, a delay control element and a signal processing element. The array is configured to detect a signal at a particular location using an initial time delay. The delay control element is configured to modify the initial time delay by a selected value and to apply a phase delay in an amount equal to the selected value and at a frequency of the signal. The signal processing element is configured to determine whether the signal corresponds to one of a physical source or a nonlinear signal effect based on whether a shift in a perceived location of the signal occurs.

Embodiments of the invention provide an ability to determine whether a signal of interest is resultant from a real signal source or whether the signal of interest is an artifact generated as a result of the second order nonlinearity of microwave devices utilized in ESAs. As a result, system capabilities may be enhanced without substantially increasing system cost, complexity and power consumption.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
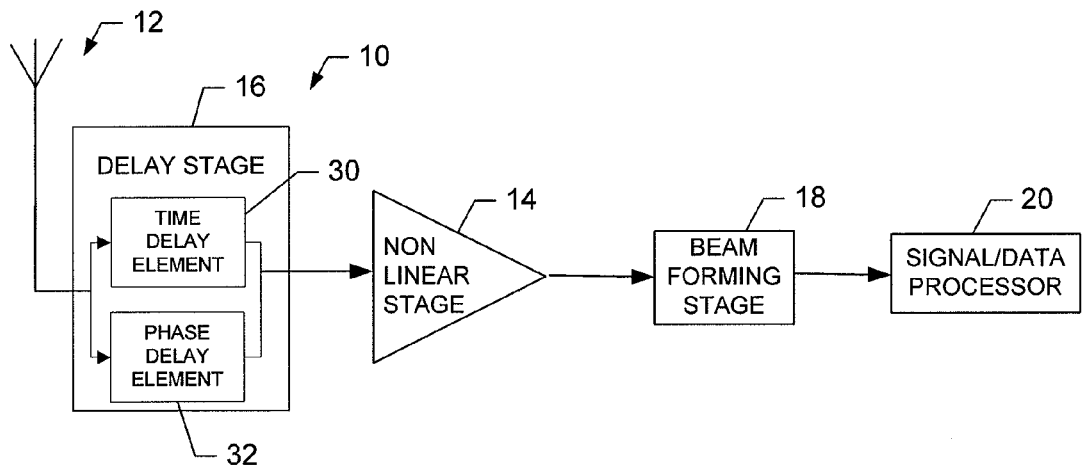
FIG. 1 is a basic block diagram illustrating a portion of a receive chain of an exemplary wideband receive only ESA according to an exemplary embodiment of the present invention.

Embodiments of the present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like reference numerals refer to like elements throughout.

FIG. 1 is a basic block diagram illustrating a portion of a receive chain of an exemplary wideband receive only ESA, which will be referred to hereinafter as a wideband ESA 10. As shown in FIG. 1, the receive chain of the wideband ESA 10 generally includes an array 12, a nonlinear stage 14, a delay stage 16, a beamforming stage 18 and a signal/data processor 20. It should be noted that each of the array 12, the nonlinear stage 14, and the delay stage 16 may include multiple sub elements. In other words, the array 12 could include multiple receiver modules and/or antennas, the nonlinear stage 14 could include multiple amplifiers or other nonlinear devices, and the delay stage 16 could include multiple delay elements. As such, it should be understood that FIG. 1 merely provides an exemplary structure and many modifications are possible as will be appreciated by one of skill in the art.

The array 12 may receive a plurality of signals, each of which may be detected at a particular frequency and at a particular angle with respect to the orientation of the array 12. The beamforming element 18 may be capable of receiving an input including quantized signals suitable for processing in the beamforming element 18 and communication with a signal/data processor 20 (i.e., a signal processing element). In general terms, beamforming is the spatial filtering of signals. The beamforming element 18 receives digital inputs from the receive chain and sums the digital inputs to create a single beam with a maximum output in a direction of a desired or detected signal. The signal/data processor 20 may include computer elements, such as hardware components, software components or combinations thereof, which act on quantized samples of an analog signal, for example, to detect a desired signal in the presence of interference. The signal/data processor 20 may perform operations including, for example, pulse compression, Doppler filtering, constant false alarm rate determination, thresholding, and data extraction.

Figure 2:
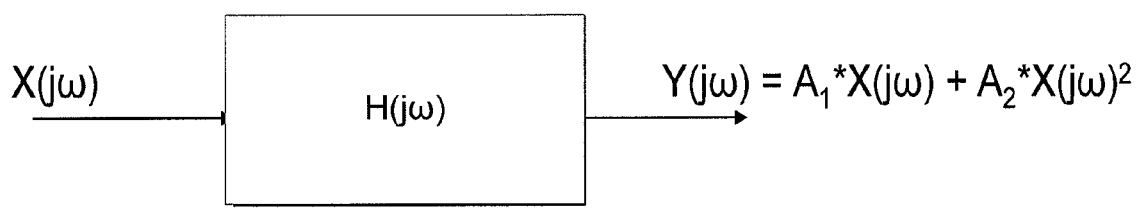
FIG. 2 illustrates a diagram of a second order nonlinear system according to an exemplary embodiment of the present invention.

The nonlinear stage 14 may include amplifier or receiver components that have nonlinear characteristics. As is well known in the art, for example, second order nonlinear systems may be modeled as an input signal added to its square as shown for example in FIG. 2. This characteristic of nonlinear components stands in contrast to that of linear components which provide the spectrum of an input to merely be altered in magnitude and phase by the transfer function of the linear system without the creation of higher order frequencies, which occurs in nonlinear systems as shown in FIG. 2. In FIG. 2, an input (i.e., X(jω)) is modified by a transfer function (i.e., H(jω)) of a nonlinear system in order to produce an output (i.e., Y(jω)) which includes indications of nonlinear signal effects.

Figure 3:
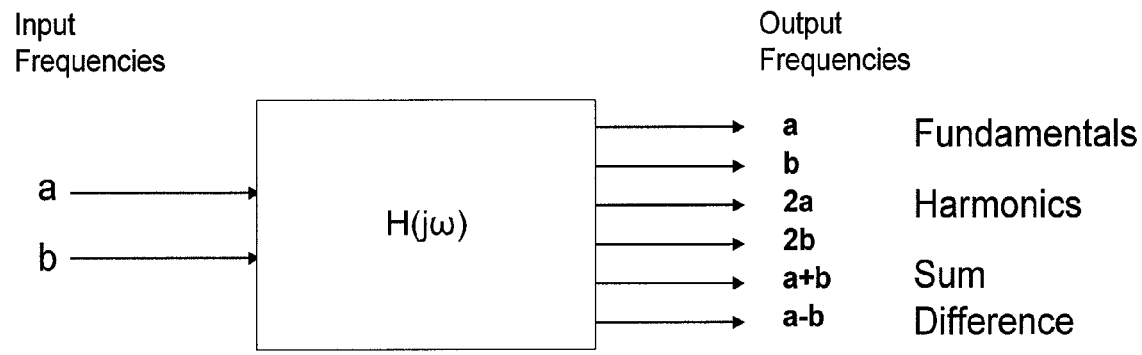
FIG. 3 is a diagram illustrating the impact of second order nonlinearities due to intermodulation according to an exemplary embodiment of the present invention.

As shown in FIG. 3, for example, the impact of second order nonlinearities can be quite pronounced since each signal modulates every other signal, which is referred to as intermodulation. Accordingly, two sinusoidal inputs may produce six sinusoidal outputs including each of the two fundamental frequencies (i.e., a and b), a harmonic of both a and b (i.e., 2a and 2b although it should be noted that other harmonics are also possible such as 3a and 3b etc.), and a sum and difference signal (i.e., a+b and a−b, respectively, although it should be noted that third order sum and difference frequencies may also be present). Each of the six sinusoidal outputs may appear in real space as a potential target. Due to intermodulation, real environments involving a plurality of signals create much more complicated results.

An ESA that employs only true time delay circuitry in the delay stage 16 will demonstrate wide band response since the response does not "steer" with signal frequency. In other words, all signals that correspond to sources that lie at a given angle from the array boresight or broadside will be detected by the array 12 at the given scan angle regardless of the frequency of the signals. This phenomenon is different than for a pure phase delay case, because phase delay arrays display a strong frequency dependence. In order for a signal to generate a response in a phase delay antenna, the product of the signal's frequency and position in sine space must match the product of a designated scanning frequency ($f_0$) of the array and the beam angle in sine space i.e., scanning angle (e.g., a frequency/position product). Consequently, all signals that lie at the position where the phase delay array is pointing will not be detected if their frequency differs from the designated scanning frequency. On the other hand, some signals that are in locations different from the scanning angle will produce a response in the array due to the frequency offset from the designated scanning frequency causing the frequency/position product to match that of the array's scanning settings.

Figure 11:
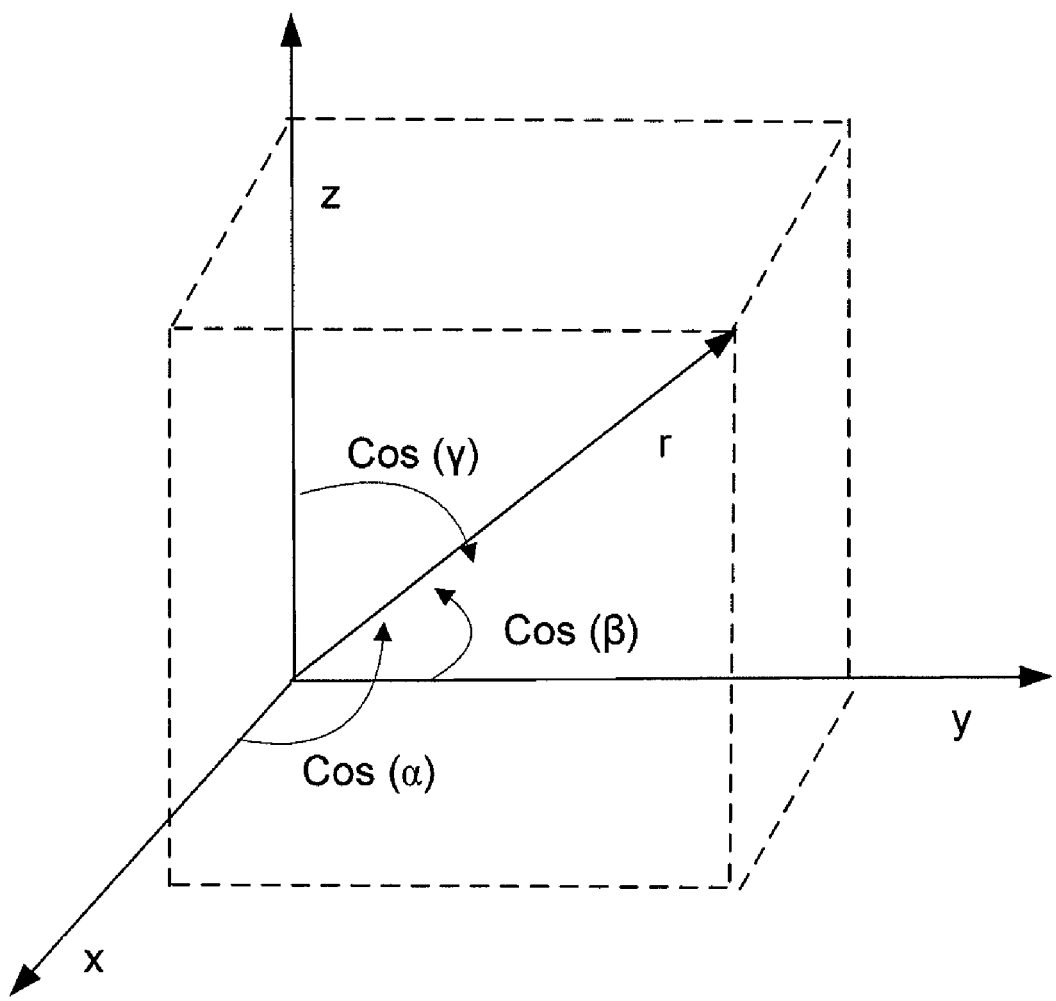
FIG. 11 is a diagram illustrating a definition of sine space according to an exemplary embodiment of the present invention.

It should be noted that the term "steer" as used herein should be understood to indicate an angular deflection of a signal. In other words, if a signal is steered, the signal should be understood to have undergone a particular amount of apparent angular deflection from the angle of initial detection. It should also be noted that the term "sine space" is defined in terms of direction cosines as shown in FIG. 11. Referring now to FIG. 11, for a pointing angle r, has a pointing angle in sine space defined by cos (α) in the azimuth direction, cos(β) in the elevation direction in the x,y plane.

The characteristic of a true time delay antenna of a lack of preferential treatment of different frequencies (i.e., no steering of signal response with signal frequency) which causes time delay based antennas to exhibit wide band properties also results in a difficulty in distinguishing ghost beams from true signal sources. This occurs since, when a time delayed signal encounters nonlinear circuitry, both the signal received and the time delay added to the signal received are equally affected by the nonlinearity as shown by Equation (1) below. In each of the equations below, it should be understood that $\omega_0$, $\omega_1$ and $\omega_2$ each represent respective signals, $\theta_0$, $\theta_1$ and $\theta_2$ represent respective angles at which corresponding signals are received, A represents a relative term weighting, E represents a magnitude of a corresponding electric field, $N_j$ represents the number of elements in an array, d represents the spacing between the elements, and c represents the speed of light. Additionally, it should be understood that the subscripts 1 and 2 correspond to a first and second signal, respectively, while the subscript 0 corresponds to a target signal, which is defined based on ESA settings.

Equation (1)

$$S_4 = A_1 E_1 \cos(\omega_1 t) \cdot \frac{\sin\left(\frac{N_j}{2} \cdot \frac{d}{c} \cdot \omega_1(\sin(\theta_0) - \sin(\theta_1))\right)}{\sin\left(\frac{1}{2} \cdot \frac{d}{c} \cdot \omega_1(\sin(\theta_0) - \sin(\theta_1))\right)} + A_1 E_2 \cos(\omega_2 t) \cdot \frac{\sin\left(\frac{N_j}{2} \cdot \frac{d}{c} \cdot \omega_2(\sin(\theta_0) - \sin(\theta_2))\right)}{\sin\left(\frac{1}{2} \cdot \frac{d}{c} \cdot \omega_2(\sin(\theta_0) - \sin(\theta_2))\right)} \ldots \quad \text{Fundamental response}$$

$$+ \frac{A_2 E_1^2}{2} \cos(2\omega_1 t) \cdot \frac{\sin\left(\frac{N_j}{2} \cdot \frac{d}{c} \cdot 2\omega_1(\sin(\theta_0) - \sin(\theta_1))\right)}{\sin\left(\frac{1}{2} \cdot \frac{d}{c} \cdot 2\omega_1(\sin(\theta_0) - \sin(\theta_1))\right)} + \frac{A_2 E_2^2}{2} \cos(2\omega_2 t) \cdot \frac{\sin\left(\frac{N_j}{2} \cdot \frac{d}{c} \cdot 2\omega_2(\sin(\theta_0) - \sin(\theta_2))\right)}{\sin\left(\frac{1}{2} \cdot \frac{d}{c} \cdot 2\omega_2(\sin(\theta_0) - \sin(\theta_2))\right)} \ldots \quad \text{Harmonic response}$$

$$+ A_2 E_1 E_2 \cos((\omega_1 + \omega_2)t) \cdot \frac{\sin\left(\frac{N_j}{2} \cdot \frac{d}{c} \cdot ((\omega_1 + \omega_2)\sin(\theta_0) - \omega_1 \sin(\theta_1) - \omega_2 \sin(\theta_2))\right)}{\sin\left(\frac{1}{2} \cdot \frac{d}{c} \cdot ((\omega_1 + \omega_2)\sin(\theta_0) - \omega_1 \sin(\theta_1) - \omega_2 \sin(\theta_2))\right)} \ldots \quad \text{Sum response}$$

$$+ A_2 E_1 E_2 \cos((\omega_1 - \omega_2)t) \cdot \frac{\sin\left(\frac{N_j}{2} \cdot \frac{d}{c} \cdot ((\omega_1 - \omega_2)\sin(\theta_0) - \omega_1 \sin(\theta_1) + \omega_2 \sin(\theta_2))\right)}{\sin\left(\frac{1}{2} \cdot \frac{d}{c} \cdot ((\omega_1 - \omega_2)\sin(\theta_0) - \omega_1 \sin(\theta_1) + \omega_2 \sin(\theta_2))\right)} \quad \text{Difference response}$$

As such, the fundamental signal and nonlinear artifacts experience the same alteration. Since time delay scanning does not steer with frequency, for any given time delay scan angle, all signals and nonlinear artifacts will appear at static scan positions, unvarying with antenna settings. Accordingly, since there is no fundamental difference between artifacts and signals corresponding to actual targets there is no way to discriminate between the artifacts and the signals corresponding to actual targets.

In an example of a conventional wideband ESA, the delay stage 16 may include only pure time delay circuitry. However, according to an exemplary embodiment of the present invention, the delay stage 16 may include both a time delay element 30 and a phase delay element 32 as shown in FIG. 1. The time delay element 30 (or time delay unit (TDU)) may include pure time delay circuitry similar to that which may be employed in the exemplary conventional wideband ESA described above. Meanwhile the phase delay element 32 (or phase delay unit (PDU)) may include phase delay circuitry. The time and phase delay elements 30 and 32 may include any circuitry capable of producing corresponding time and phase delays, respectively, that may be known in the art. In the context of the discussion below, it should be understood that if the delay stage 16 employs only the time delay element 30 to act on a signal, the wideband ESA 10 may be considered as a time delay array. Meanwhile, if the delay stage 16 employs only the phase delay element 32, then the wideband ESA 10 may be considered as a phase delay array. As such, although the time and phase delay elements 30 and 32 are shown in parallel, it should be understood that either one or the other may be enabled to act on an input signal to create either the time delay array or the phase delay array, respectively, for purposes of the descriptions that follow. Accordingly, a mode switching mechanism may be employed to switch between time and phase delay array modes of operation.

In an exemplary embodiment, the delay stage 16 may initially operate in a normal or conventional mode of operation such that only the time delay element 30 and not the phase delay element 32 acts upon incoming signals. As such, a pure time delay array characteristic may initially be utilized in order to ensure wide band operation of the ESA. However, in response to detection of a signal of interest, the phase delay element 32 may be utilized to introduce a phase delay in accordance with the description below. In general terms, the signal of interest which has initially been detected using a pure time delay array may be interrogated by adding an amount of phase delay (using the phase delay element 32) in place of an equivalent amount of the time delay required to detect the signal of interest. The designated scanning frequency ($f_0$) for the phase delay may be set to be the same as a frequency of the signal of interest. By performing the interrogation generally described above, a narrow bandwidth characteristic of a phase delay based array may be exploited in that differences between the fundamental response and nonlinear artifact responses tend to emerge as described below. Accordingly, as will be seen below, a combination of time and phase delays may be employed to remove ambiguity between responses that correspond to actual targets and responses that correspond to nonlinear artifacts.

The use of phase delay circuitry instead of time delay circuitry can counteract the difficulty in differentiating signals corresponding to real, physical or actual sources (i.e., targets) from signals corresponding to second order nonlinear artifacts (i.e., ghost beams). In this regard, due to the fact that the narrow frequency response of phase delay circuitry utilizes both a scanning angle and a designated scanning frequency $f_0$, with which to compute the phase delay for various array elements, detected signals "steer" or shift with changes in the designated scanning frequency $f_0$. When nonlinearities occur after the phase delay, the phase delay values also encounter the nonlinearity. As a result, when the phase delay encounters the nonlinearity, harmonic signals steer as a function of $2*f_0$. To the contrary, if the phase delay encounters a linear system, the harmonic signals steer as a function of $f_0$. Equation (2) below shows an example of a nonlinear antenna response for a pure phase delay array with a two tone input (i.e., two inputs having distinct frequencies) and a second order nonlinearity following the delay circuitry.

Equation (2)

$$S_4 = A_1 E_1 \cos(\omega_1 t) \cdot \frac{\sin\left(\frac{N_j}{2} \frac{d}{c} \cdot (\omega_0 \sin(\theta_0) - \omega_1 \sin(\theta_1))\right)}{\sin\left(\frac{1}{2} \cdot \frac{d}{c} \cdot (\omega_0 \sin(\theta_0) - \omega_1 \sin(\theta_1))\right)} + A_1 E_2 \cos(\omega_2 t) \cdot \frac{\sin\left(\frac{N_j}{2} \frac{d}{c} \cdot (\omega_0 \sin(\theta_0) - \omega_2 \sin(\theta_2))\right)}{\sin\left(\frac{1}{2} \cdot \frac{d}{c} \cdot (\omega_0 \sin(\theta_0) - \omega_2 \sin(\theta_2))\right)} \ldots \quad \Big\} \text{Fundamental response}$$

$$+ \frac{A_2 E_1^2}{2} \cos(2\omega_1 t) \cdot \frac{\sin\left(\frac{N_j}{2} \frac{d}{c} \cdot (2\omega_0 \sin(\theta_0) - 2\omega_1 \sin(\theta_1))\right)}{\sin\left(\frac{1}{2} \cdot \frac{d}{c} \cdot (2\omega_0 \sin(\theta_0) - 2\omega_1 \sin(\theta_1))\right)} + \frac{A_2 E_2^2}{2} \cos(2\omega_2 t) \cdot \frac{\sin\left(\frac{N_j}{2} \frac{d}{c} \cdot (2\omega_0 \sin(\theta_0) - 2\omega_2 \sin(\theta_2))\right)}{\sin\left(\frac{1}{2} \cdot \frac{d}{c} \cdot (2\omega_0 \sin(\theta_0) - 2\omega_2 \sin(\theta_2))\right)} \ldots \quad \Big\} \text{Harmonic response}$$

$$+ A_2 E_1 E_2 \cos((\omega_1 + \omega_2)t) \cdot \frac{\sin\left(\frac{N_j}{2} \frac{d}{c} \cdot (2\omega_0 \sin(\theta_0) - \omega_1 \sin(\theta_1) - \omega_2 \sin(\theta_2))\right)}{\sin\left(\frac{1}{2} \frac{d}{c} \cdot (2\omega_0 \sin(\theta_0) - \omega_1 \sin(\theta_1) - \omega_2 \sin(\theta_2))\right)} \ldots \quad \Big\} \text{Sum response}$$

$$+ A_2 E_1 E_2 \cos((\omega_1 - \omega_2)t) \cdot \frac{\sin\left(\frac{N_j}{2} \frac{d}{c} \cdot (-\omega_1 \sin(\theta_1) + \omega_2 \sin(\theta_2))\right)}{\sin\left(\frac{1}{2} \cdot \frac{d}{c} \cdot (-\omega_1 \sin(\theta_1) + \omega_2 \sin(\theta_2))\right)} \quad \Big\} \text{Difference response}$$

In reference to Equation 2, $\omega_0$ is set according to the time component of the signal of interest. Thus, if $2\omega_1$ is the signal of interest, then $\omega_0$ may be set to $2\omega_1$ (i.e., $\omega_0=2\omega_1$). This causes terms to be $2(2\omega_1)\sin\theta_0-2\omega_1\sin\theta_1$. A peak occurs when the preceding function is set equal to zero so $\sin\theta_0=\frac{1}{2}\sin\theta_1$. Nonlinear artifacts created from the sum of two signals will also steer as a function of $2*f_0$. Additionally, the beamwidth of such nonlinear artifacts is one half of the expected beamwidth as the corresponding frequency. Signals corresponding to physical sources, however, respond exactly as they would in a purely linear phase delay antenna. In other words, signals corresponding to physical sources steer as a function of $f_0$ and also maintain the expected beamwidth.

Based on the effects described above, signals corresponding to physical sources may be differentiated from signals that correspond to second order nonlinear artifacts. In this regard, signals corresponding to physical sources, or real signals, will steer in response to a phase delay in a manner similar to the response of a signal to a linear phase delay, while most of the higher order terms will steer with frequency at twice the rate of an antenna employing a linear phase delay. In an exemplary embodiment, detected signals are interrogated with the designated scanning frequency $f_0$ being set to the frequency of the detected signal. Thus, for example, if a signal corresponding to a nonlinear artifact is detected at a particular frequency $f_{clutter}$, the designated scanning frequency $f_0$ is set to the frequency of the detected signal (i.e., $f_{clutter}$). In other words, the designated scanning frequency $f_0$, which may be considered to be an interrogating frequency, is set to be equal to $f_{clutter}$. The phase delay based on the interrogating frequency also encounters the nonlinearity, so an effective phase delay designated frequency for the higher order terms is twice the frequency of the detected signal, or $2*f_{clutter}$. Thus, the array will actually detect a response at a scan angle located at one half of the distance in sine space between the array boresight and the location of the corresponding signal in a pure time delay array response. Accordingly, when a pure time delay response is compared to the result of the interrogation, there is an apparent relocation of higher order terms if the signal being interrogated corresponds to a nonlinear artifact. Meanwhile, if the detected signal corresponds to a physical source, interrogation of the detected signal will not cause an apparent relocation of the higher order terms including the harmonic and the sum responses. Instead, the interrogated detected signal will appear in the same location as the detected signal in the pure time delay array. Accordingly, signals corresponding to physical sources may be differentiated from signals corresponding to nonlinear artifacts.

It should be noted, however, that the difference frequencies (i.e., nonlinear artifacts created at a frequency equal to the difference between two input signals (i.e., possible target tones) do not fall into the pattern described above. Phase delay array response to difference frequencies may actually be independent of scan angle and target scan frequency. As such, amplitudes of corresponding difference frequencies may be a function only of the individual source locations and frequencies. Accordingly, difference frequencies may not steer with frequency at all.

Using the information above regarding the properties of signals corresponding to physical sources and nonlinear artifacts, interrogation of detected signals may be used to determine whether a given signal that is detected corresponds to a ghost beam artifact or a physical source. Specifically, by switching modes between a pure time delay array and pure phase delay array, a relatively quick analysis of signal location in sine space may enable differentiation between "real signals" which correspond to physical sources and ghost beam signals. However, such a mode switch may not be immune to ambiguity. For example, due to the relocation of higher order terms described above, when the array is switched completely from the time delay array to the phase delay array, nonlinear artifacts will no longer appear in sine space at their previous location upon direct interrogation, while real signals will remain stationary. Ambiguity arises when two artifacts exist at the same frequency, but at a specific set of different angles. For example, when switching from time delay to phase delay, an artifact at a particular location in the phase delay array output may appear at a corresponding equivalent location to that of the other artifact in the time delay array output. The ambiguity could, for example, be countered through beamwidth examination, however, with large numbers of signals, beamwidth examination may not be practicable due to spatial density of artifacts and real signals or due to requirements for ultra-fine beam resolution.

It should be noted that an exemplary embodiment may rely purely on examining the beamwidth of signals in a pure phase delay case. However, examining the beamwidth of signals in the pure phase delay case would rid a device employing such examination of a wideband search use.

Figure 4:
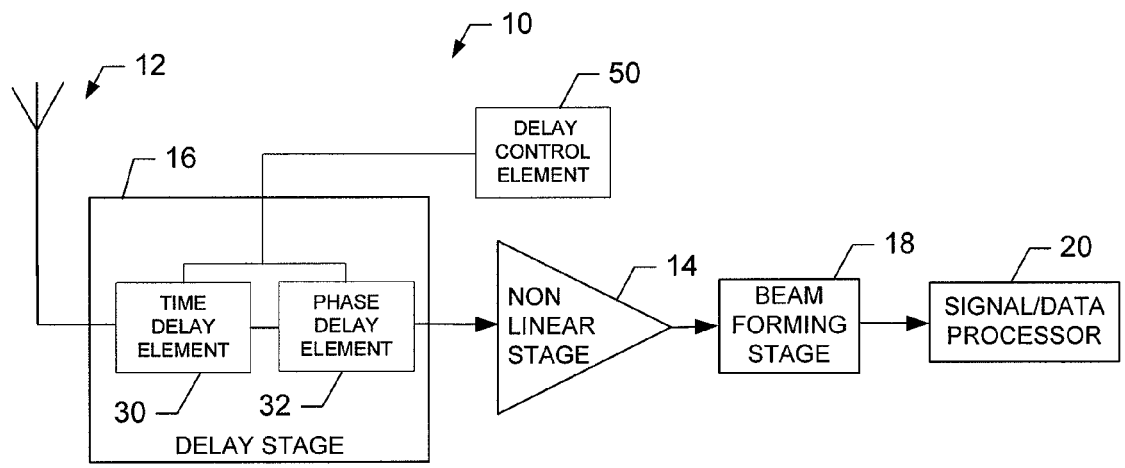
FIG. 4 is a diagram illustrating a basic block diagram of a portion of a receive chain of a wideband ESA according to an exemplary embodiment of the present invention.

In order to overcome the issues described above, which may exhibit ambiguity in certain situations where pure time and phase delay array characteristics are utilized, an exemplary embodiment of the present invention provides for combining both the time delay element 30 and the phase delay element 32 in series within the delay stage 16. FIG. 4 is a diagram illustrating a basic block diagram of a portion of a receive chain of the wideband ESA 10 according to another exemplary embodiment. In FIG. 4, the time delay element 30 and the phase delay element 32 are placed in series with each other. As such, following the detection of a particular signal with a given time delay, the time delay may then be changed by applying a time delay offset comprising an overshoot or undershoot and then an amount of phase delay at an interrogation frequency equivalent to the amount of overshoot or undershoot may be applied to compensate for the overshoot or undershoot. If the resulting location of the interrogated signal is substantially the same as the initial location, then the signal corresponds to a physical source. However, if the resulting location is not substantially the same as the initial location, then the signal corresponds to a ghost beam.

Figure 5:
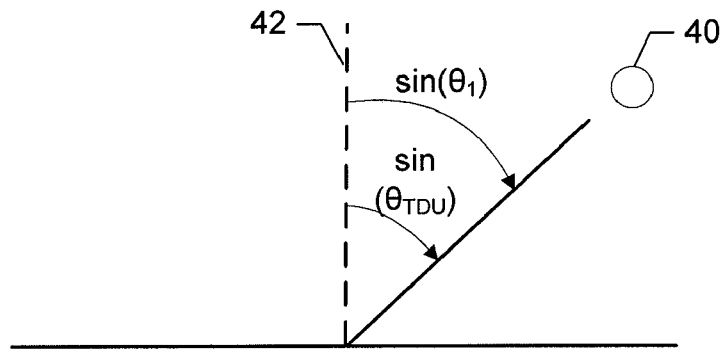
FIG. 5 illustrates a detected signal at an initial angle relative to the boresight according to an exemplary embodiment of the present invention.
Figure 6:
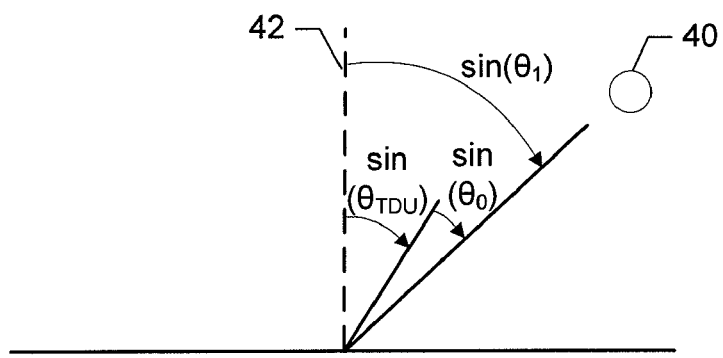
FIG. 6 illustrates an interrogation of the detected signal according to an exemplary embodiment of the present invention.
Figure 7:
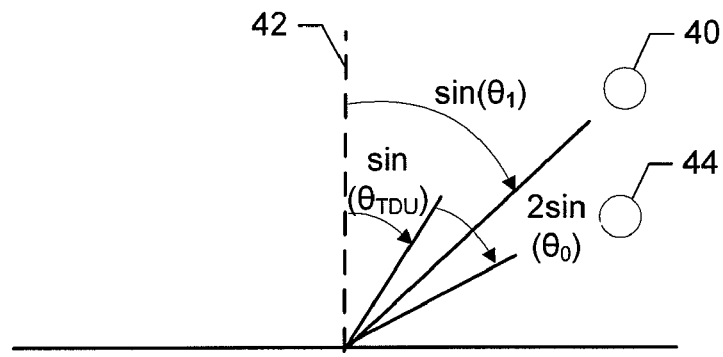
FIG. 7 illustrates an interrogation of the detected signal according to an exemplary embodiment of the present invention.

In this regard, FIG. 5 illustrates a detected signal which is initially detected in a first location 40 having an angular position of $\theta_1$ relative to a boresight 42 of an array (or $\sin\theta_1$ in sine space). As shown in FIG. 5, an initial amount of time delay $\theta_{TDU}$ is applied by the time delay element 30 during detection of the detected signal. The time delay element 30 may then be adjusted to change the amount of time delay $\theta_{TDU}$ applied in order to either overshoot or undershoot the first location 40. In this exemplary embodiment, as shown in FIGS. 6 and 7, the amount of time delay $\sin(\theta_{TDU})$ is adjusted to undershoot the first location 40 by an amount $\sin(\theta_0)$. However, it should be understood that an overshoot could also be applied. Either simultaneously or subsequently an equivalent amount of phase delay is added. If the detected signal corresponds to a physical source, for reasons described above, the detected signal will appear substantially at the first location 40 when the equivalent amount of phase delay is added to counter the time delay provided for undershoot as shown, for example, in FIG. 6. Meanwhile, if the detected signal corresponds to a nonlinear artifact or ghost beam, for reasons described above, the detected signal will demonstrate a response corresponding to pointing the beam at a second location 44 when the equivalent amount of phase delay is added to counter the time delay provided for undershoot as shown, for example, in FIG. 7. As shown in FIG. 7, the second location 44 may be different from the first location 40 by an amount substantially equal to the value of $\sin(\theta_0)$. In other words, if the detected signal corresponds to a nonlinear artifact, the location at which the detected signal will appear during interrogation will be shifted by $\sin(2*\theta_0)$ instead of being shifted by $\sin(\theta_0)$ as would be expected for a signal corresponding to a physical source. Consequently, the higher order terms are detected when $\sin(\theta_{TDU})+\sin(\theta_0)=\sin(\theta_1)-\sin(\theta_0)$ and thereby appear to relocate due to the interrogation process.

It should be noted that the time delay element 30 and the phase delay element 32 may be disposed in any particular order. In other words, the ordering of the time and phase delay elements 30 and 32 is relatively interchangeable without any noticeable effect on the system. It should also be noted that the amount of overshoot or undershoot may be either a set or predetermined value, or the amount of overshoot or undershoot may be acquired via a scan such that no other signal will fall within a selected band. In an exemplary embodiment, the overshoot or undershoot could be accomplished such that the beam is shifted by the overshoot or undershoot in order to point to a place where no other detected signal is located. Equation (3) below illustrates the nonlinear response for a combined time delay and phase delay array for a two tone input and second order nonlinearity occurring after the delay circuitry.

utilized in order to execute an algorithm for mode switching or otherwise controlling the time delay element 30 and/or the phase delay element 32 in accordance with the methods described herein. As such the delay control element 50 may be embodied as any means or device embodied in either hardware, software, or a combination of hardware and software that is capable of instituting the methods described herein, for example, under the control of a processing element, which may be an external processing element or may be internal to the wideband ESA 10.

Thus, when interrogating any given signal with the methods described herein, the designated scanning frequency $f_0$ may be set to the frequency of the given signal. Then, as more phase delay is added to replace the amount of time delay modification provided, higher order ghost beams will steer out of the main beam response while physical sources will appear to be stationary. The combined time and phase delay array can thus fix the beam in relation to physical source space, while scanning through all of the nonlinear artifact space by adjusting the relative amounts of phase and time delay. Upon recognition of the response described above, numerous methods may be employed to exploit the response. For example, selective time delay boresight adjustment, spatial analysis of matched scans and quantized dithering are examples of methods that may utilize information gathered pursuant to the operations described herein. Accordingly, as described herein the implementation of a combination of time and phase delay elements in series and the further implementation of a mode switching mechanism to permit a pure time delay scan followed by a time delay offset and matching phase delay application provides for Equation (3)

$$S_4 = A_1 E_1 \cos(\omega_1 t) \cdot \frac{\sin\left(\frac{N_j}{2}\frac{d}{c}\cdot(\omega_0\sin(\theta_0) - \omega_1(\sin(\theta_1) - \sin(\theta_{TDU})))\right)}{\sin\left(\frac{1}{2}\cdot\frac{d}{c}\cdot(\omega_0\sin(\theta_0) - \omega_1(\sin(\theta_1) - \sin(\theta_{TDU})))\right)} + A_1 E_2 \cos(\omega_2 t)\cdot\frac{\sin\left(\frac{N_j}{2}\frac{d}{c}\cdot(\omega_0\sin(\theta_0) - \omega_2(\sin(\theta_2) - \sin(\theta_{TDU})))\right)}{\sin\left(\frac{1}{2}\cdot\frac{d}{c}\cdot(\omega_0\sin(\theta_0) - \omega_2(\sin(\theta_2) - \sin(\theta_{TDU})))\right)} \cdots \right\} \text{Fundamental response}$$

$$+ \frac{A_2 E_1^2}{2}\cos(2\omega_1 t)\cdot\frac{\sin\left(\frac{N_j}{2}\frac{d}{c}\cdot\left(\begin{array}{c}2\omega_0\sin(\theta_0) - \\ 2\omega_1(\sin(\theta_1) - \sin(\theta_{TDU}))\end{array}\right)\right)}{\left(\begin{array}{c}\frac{1}{2}\cdot\frac{d}{c}\cdot(2\omega_0\sin(\theta_0) - \\ \sin(2\omega_1(\sin(\theta_1) - \sin(\theta_{TDU})))\end{array}\right)} + \frac{A_2 E_2^2}{2}\cos(2\omega_2 t)\cdot\frac{\sin\left(\frac{N_j}{2}\frac{d}{c}\cdot(2\omega_0\sin(\theta_0) - 2\omega_2(\sin(\theta_2) - \sin(\theta_{TDU})))\right)}{\sin\left(\frac{1}{2}\cdot\frac{d}{c}\cdot(2\omega_0\sin(\theta_0) - 2\omega_2(\sin(\theta_2) - \sin(\theta_{TDU})))\right)} \cdots \right\} \text{Harmonic response}$$

$$+ A_2 E_1 E_2 \cos((\omega_1 + \omega_2)t)\cdot\frac{\sin\left(\frac{N_j}{2}\frac{d}{c}\cdot(2\omega_0\sin(\theta_0) + (\omega_1 + \omega_2)\sin(\theta_{TDU}) - \omega_1\sin(\theta_1) - \omega_2\sin(\theta_2))\right)}{\sin\left(\frac{1}{2}\cdot\frac{d}{c}\cdot(2\omega_0\sin(\theta_0) + (\omega_1 + \omega_2)\sin(\theta_{TDU}) - \omega_1\sin(\theta_1) - \omega_2\sin(\theta_2))\right)} \cdots \right\} \text{Sum response}$$

$$+ A_2 E_1 E_2 \cos((\omega_1 + \omega_2)t)\cdot\frac{\sin\left(\frac{N_j}{2}\frac{d}{c}\cdot((\omega_1 - \omega_2)\sin(\theta_{TDU}) - \omega_1\sin(\theta_1) + \omega_2\sin(\theta_2))\right)}{\sin\left(\frac{1}{2}\cdot\frac{d}{c}\cdot((\omega_1 - \omega_2)\sin(\theta_{TDU}) - \omega_1\sin(\theta_1) + \omega_2\sin(\theta_2))\right)} \right\} \text{Difference response}$$

The action of applying an amount of phase delay to match an amount of overshoot or undershoot in the time delay applied may be performed, for example, by instituting any software capable of carrying out instructions for such operations. In this regard, a delay control element 50 may be discrimination between signals corresponding to physical sources and signals corresponding to nonlinear signal effects or artifacts.

Figure 8:
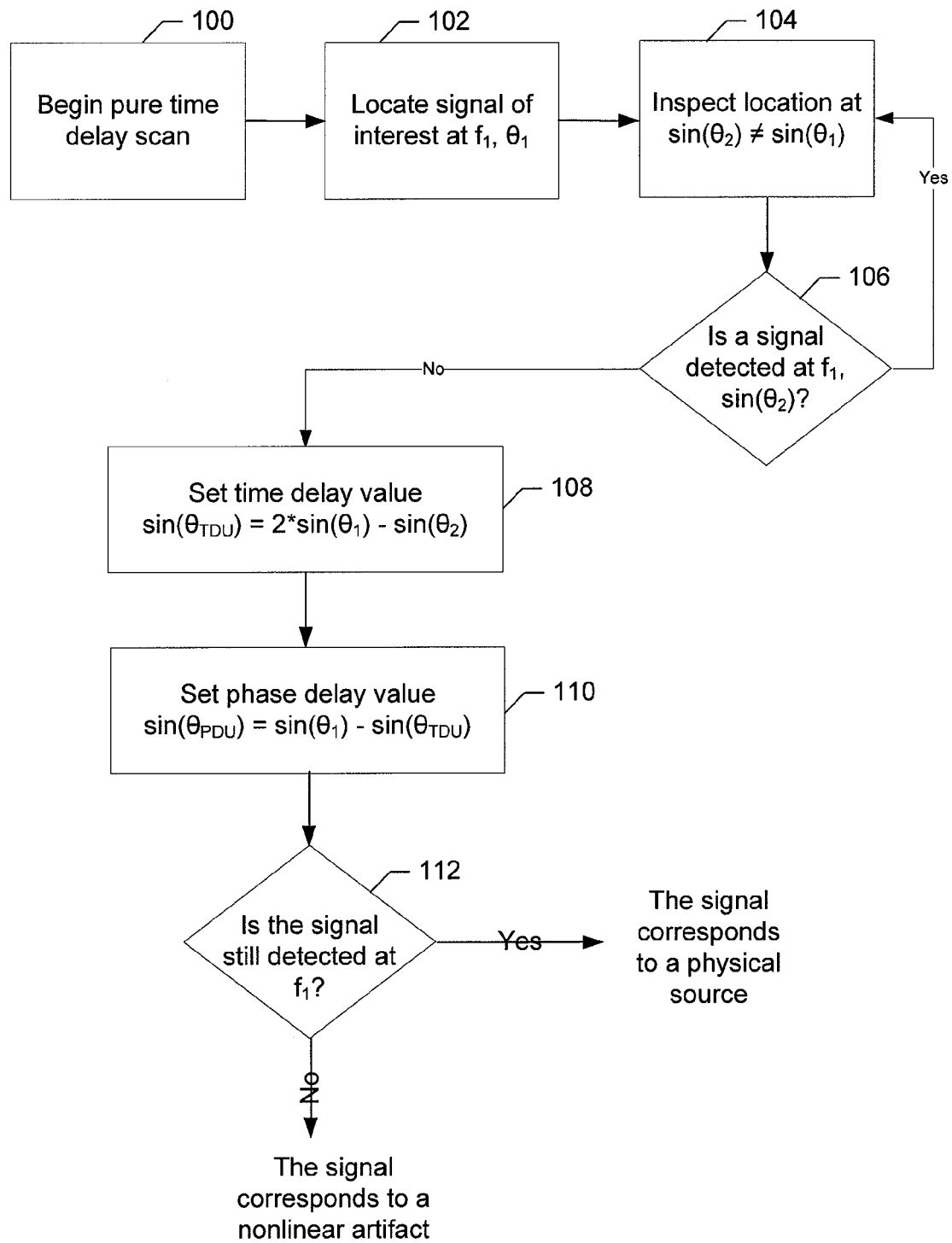
FIG. 8 is a flowchart according to an exemplary method of differentiating between signals corresponding to physical sources and signals corresponding to second order nonlinear signal effects according to one embodiment of the present invention.
Figure 9:
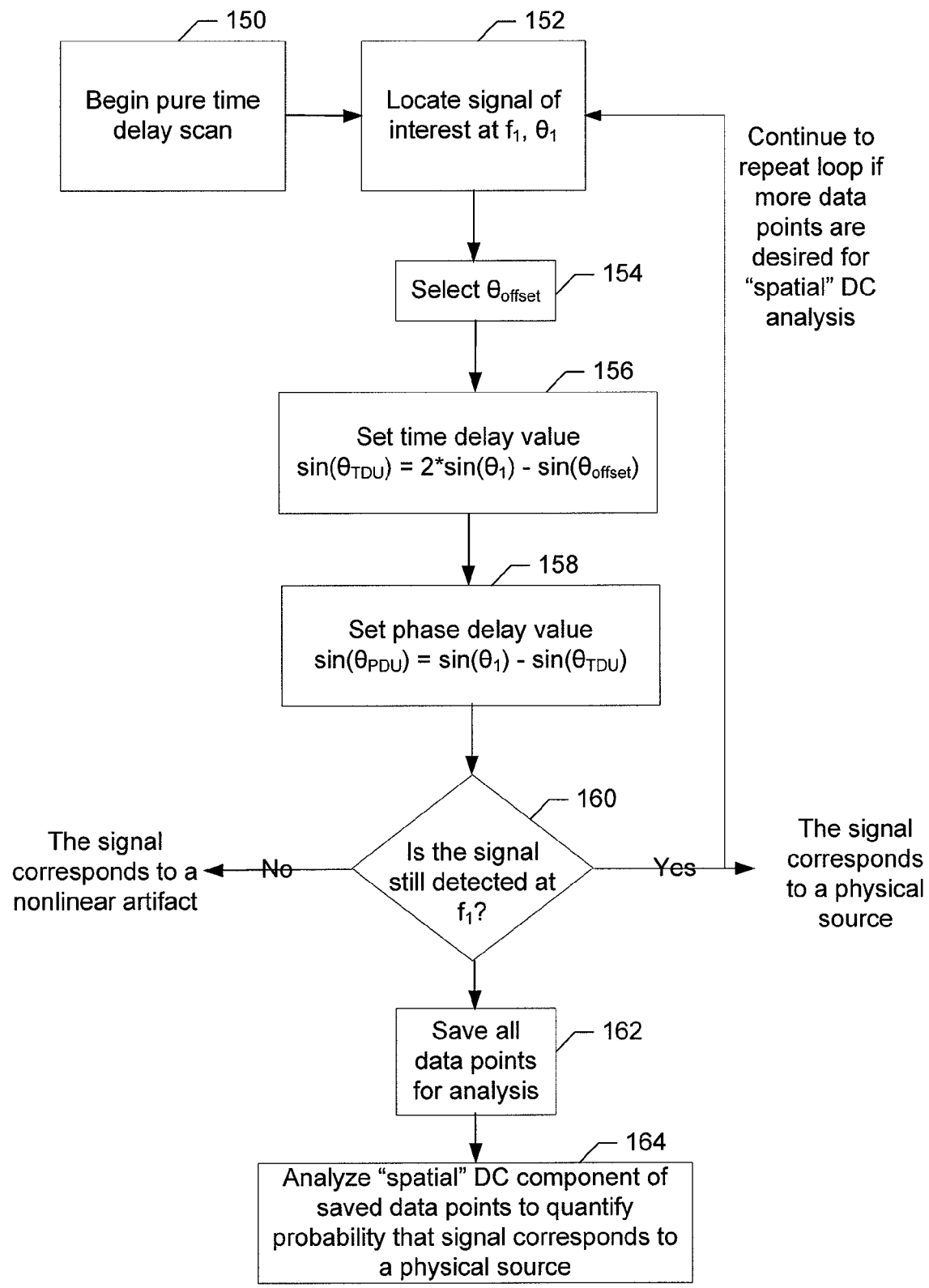
FIG. 9 is a flowchart according to an exemplary method of differentiating between signals corresponding to physical sources and signals corresponding to second order nonlinear signal effects according to another embodiment of the present invention.
Figure 10:
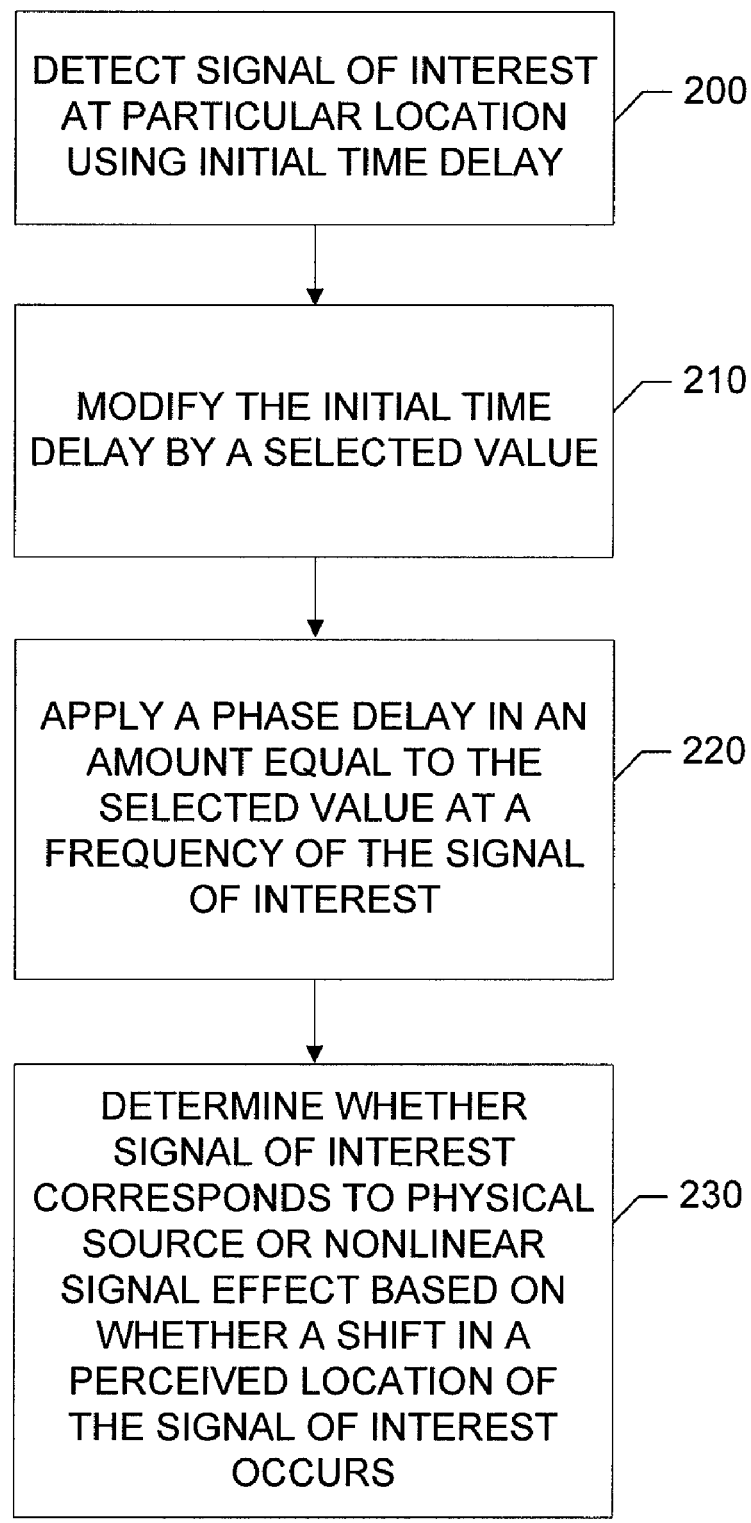
FIG. 10 is a flowchart according to an exemplary method of differentiating between signals corresponding to physical sources and signals corresponding to second order nonlinear signal effects according to another embodiment of the present invention.

FIGS. 8-10 are flowcharts of a system, methods and program products according to exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method of providing differentiation of physical sources from nonlinear signal effects, as shown in FIG. 8, a pure time delay scan is performed at operation 100. In response to the pure time delay scan, a signal of interest is located at a detection frequency $f_1$ and at an angle $\theta_1$ at operation 102. At operation 104, a location is inspected at $\sin(\theta_2) \neq \sin(\theta_1)$. At operation 106, a determination is made as to whether a signal is detected at the detection frequency $f_1$ and a location of $\sin(\theta_2)$. If a signal is detected at $f_1$, $\sin(\theta_2)$, then $\theta_2$ is altered and operation 104 is repeated. This prevents ambiguity by ensuring that the relocation of a different signal at $f_1$, $\sin(\theta_2)$ is not construed as a lack of relocation of the signal of $f_1$, $\sin(\theta_1)$. Operations 100 to 106 may be considered to be a signal of interest scan. If no signal is detected at $f_1$, $\sin(\theta_2)$, then a time delay value is set such that $\sin(\theta_{TDU})=2*\sin(\theta_1)-\sin(\theta_2)$ at operation 108 where $\theta_{TDU}$ is the time delay value. In other words, the initial time delay value is modified to begin an interrogation procedure. At operation 110, a phase delay value is set such that $\sin(\theta_{PDU})=\sin(\theta_1)-\sin(\theta_{TDU})$ where $\theta_{PDU}$ is the phase delay value. At operation 112, a determination is made as to whether the signal of interest is still detected at $f_1$. If the signal of interest is still detected at $f_1$, then the signal of interest corresponds to a physical source. However, if the signal of interest is not detected at a frequency $f_1$ or is severely attenuated, then the signal of interest corresponds to a nonlinear signal effect or clutter.

In another embodiment of a method of providing differentiation of physical sources from nonlinear signal effects, as shown in FIG. 9 a pure time delay scan is performed at operation 150. In response to the pure time delay scan, a signal of interest is located at a detection frequency $f_1$ and at an angle $\theta_1$ at operation 152. Operations 150 to 152 may be considered to be a signal of interest scan. Then at operation 154, an offset value $\theta_{offset}$ may be selected which defines an amount of change in time delay from the initial time delay value. At operation 156, a time delay value to be applied to the signal of interest ($\theta_{TDU}$) is set according to $\sin(\theta_{TDU})=\sin(\theta_1)-\sin(\theta_{offset})$. A phase delay value ($\theta_{PDU}$) is then added at operation 158 such that $\sin(\theta_{PDU})=\sin(\theta_{offset})$ at operation 158. The process described by operations 154 to 158 may be referred to as a matched scan since the time delay is inserted and a compensating amount of phase delay is then applied to match the original pointing location in physical space. A determination is then made at operation 160 as to whether the signal response is constant in magnitude between the two scan combinations. If the signal magnitude response is not constant, then the signal of interest corresponds to a nonlinear signal effect. If the signal magnitude response is constant, then the signal of interest corresponds to a physical source. In some situations, it may be desirable to perform operations 154 to 160 on a repeating loop basis to perform a "spatial" DC analysis. The term "spatial" DC analysis is known in the art to refer to comparing magnitudes of a desired frequency component across different scan combinations in which the "DC component" refers to an average amount of signal at the desired frequency component over the different scans. Thus, in an exemplary embodiment, following the determination of operation 160, all data points may be saved for analysis at operation 162. At operation 164, a "spatial" DC component of the data points saved may be analyzed in order to quantify a probability that the signal of interest corresponds to a physical source. In this regard, when performing a matched scan as described above, a "spatial" DC analysis, which is known in the art, may be performed after a relatively large number of iterations of the operations described above have been performed. It should be noted, however, that if a quantized dither is utilized, the operations above may only be performed a relatively low number of times before "spatial" DC analysis is performed.

In yet another embodiment, a method of providing differentiation of physical sources from nonlinear signal effects, as shown in FIG. 10, may include detecting a signal of interest at a particular location using an initial time delay at operation 200. At operation 210, the initial time delay is modified by a selected value. In an exemplary embodiment, the selected value may be arbitrarily selected, may be selected in order to point a beam detecting the signal of interest in a direction (i.e., to a location) where no other signals of interest are located, or may be selected subsequent to a scan of possible values. A phase delay is applied in an amount equal to the selected value at a frequency of the signal of interest to shift a perceived location of the signal of interest at operation 220. At operation 230, a determination is made as to whether or not the signal of interest corresponds to a physical source or a nonlinear signal effect based on an effect of the application of the phase delay on the perceived location of the signal of interest. Operation 230 may be performed, for example, by the signal/data processor 20 or another signal processing element. In an exemplary embodiment, the signal of interest may be determined to correspond to a physical source in response to the perceived location of the signal of interest following the application of the phase delay being substantially the same as the particular location. Accordingly, the signal of interest may be determined to correspond to a nonlinear signal effect in response to the perceived location of the signal of interest following the application of the phase delay being substantially different than the particular location. In the context of the method described above, the term location should be understood to correspond to a particular angle relative to the boresight of an array. As such, the term location may be understood to correspond to a particular beam location or frequency, and the beam location may be "steerable" as described above such that the beam may have an initial location (i.e., angular position) and then be shifted or steered by introduction of the phase and time delays to a location that may be either substantially the same as the initial location or may be substantially different than the initial location.

The above described functions may be carried out in many ways. For example, any suitable means for carrying out each of the functions described above may be employed to carry out embodiments of the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for differentiating between a signal from a physical source and a nonlinear signal effect, the method comprising:

detecting a signal at a particular location using an initial time delay;

modifying the initial time delay by a selected value;

applying a phase delay in an amount equal to the selected value and at a frequency of the signal; and determining whether the signal corresponds to one of a physical source or a nonlinear signal effect based on whether a shift in a perceived location of the signal occurs.

2. The method of claim 1, wherein modifying the initial time delay comprises selecting the selected value to shift the perceived location of the signal to a location where no other signals are located.

3. The method of claim 1, wherein modifying the initial time delay comprises selecting the selected value as one of:

an arbitrary value; or a value determined following a scan of possible values.

4. The method of claim 1, wherein determining further comprises determining the signal to correspond to the physical source in response to the perceived location of the signal following the application of the phase delay being substantially the same as the particular location.

5. The method of claim 1, wherein determining further comprises determining the signal to correspond to the nonlinear signal effect in response to the perceived location of the signal following the application of the phase delay being substantially different than the particular location.

6. The method of claim 1, further comprising storing resulting data points following determining whether the signal corresponds to one of the physical source or the nonlinear signal effect.

7. The method of claim 6, further comprising analyzing a spatial direct current component across the data points to determine a probability that the signal corresponds to the physical source.

8. The method of claim 1, further comprising performing one of:

selective time delay boresight adjustment;

spatial analysis of matched scans; or quantized dithering.

9. A computer program product for differentiating between a signal from a physical source and a nonlinear signal effect, the computer program product comprising at least one computer-readable storage medium having computer-readable program code portions stored therein, the computer-readable program code portions comprising:

a first executable portion for enabling detection of a signal at a particular location using an initial time delay;

a second executable portion for modifying the initial time delay by a selected value;

a third executable portion for applying a phase delay in an amount equal to the selected value and at a frequency of the signal; and a fourth executable portion for determining whether the signal corresponds to one of a physical source or a nonlinear signal effect based on whether a shift in a perceived location of the signal occurs.

10. The computer program product of claim 9, wherein the second executable portion includes instructions for selecting the selected value to shift the perceived location of the signal to a location where no other signals are located.

11. The computer program product of claim 9, wherein the second executable portion includes instructions for selecting the selected value as one of:

an arbitrary value; or a value determined following a scan of possible values.

12. The computer program product of claim 9, wherein the fourth executable portion includes instructions for determining the signal to correspond to the physical source in response to the perceived location of the signal following the application of the phase delay being substantially the same as the particular location.

13. The computer program product of claim 9, wherein the fourth executable portion includes instructions for determining the signal to correspond to the nonlinear signal effect in response to the perceived location of the signal following the application of the phase delay being substantially different than the particular location.

14. The computer program product of claim 9, further comprising a fifth executable portion for storing resulting data points following determining whether the signal corresponds to one of the physical source or the nonlinear signal effect.

15. The computer program product of claim 14, further comprising a sixth executable portion for analyzing a spatial direct current component across the data points to determine a probability that the signal corresponds to the physical source.

16. A system for differentiating between a signal from a physical source and a nonlinear signal effect, the system comprising:
an array configured to detect a signal at a particular location using an initial time delay;
a delay control element configured to:
modify the initial time delay by a selected value; and
apply a phase delay in an amount equal to the selected value and at a frequency of the signal; and
a signal processing element configured to determine whether the signal corresponds to one of a physical source or a nonlinear signal effect based on whether a shift in a perceived location of the signal occurs.

17. The system of claim 16, wherein the delay control element is configured to select the selected value to shift the perceived location of the signal to a location where no other signals are located.

18. The system of claim 16, wherein the delay control element is configured to select the selected value as one of:
an arbitrary value; or
a value determined following a scan of possible values.

19. The system of claim 16, further comprising a delay stage including a time delay element and a phase delay element disposed in series with the time delay element wherein the delay control element is configured to control the delay stage in order to control the time and phase delays.

20. The system of claim 16, wherein the signal processing element is configured to determine the signal to correspond to the physical source in response to the perceived location of the signal following the application of the phase delay being substantially the same as the particular location.

21. The system of claim 16, wherein the signal processing element is configured to determine the signal to correspond to the nonlinear signal effect in response to the perceived location of the signal following the application of the phase delay being substantially different than the particular location.

22. The system of claim 16, wherein the signal processing element is configured to analyze a spatial direct current component across a plurality of stored data points to determine a probability that the signal corresponds to the physical source.

* * * * *